(12) United States Patent
Lau et al.

(10) Patent No.: US 9,619,583 B2
(45) Date of Patent: Apr. 11, 2017

(54) PREDICTIVE ANALYSIS BY EXAMPLE

(71) Applicant: International Business Machines Corporation, Armonk, NY (US)

(72) Inventors: Alex T. Lau, Ontario (CA); Diana Lau, Richmond Hill (CA); Stephan F. Jou, Richmond Hill (CA); Joanna W. Ng, Unionville (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 980 days.

(21) Appl. No.: 13/908,228

(22) Filed: Jun. 3, 2013

(65) Prior Publication Data
US 2013/0332481 A1 Dec. 12, 2013

(30) Foreign Application Priority Data
Jun. 6, 2012 (CA) ...................................... 2779349

(51) Int. Cl.
*G06F 7/00* (2006.01)
*G06F 17/30* (2006.01)
(52) U.S. Cl.
CPC .. *G06F 17/30979* (2013.01); *G06F 17/30427* (2013.01); *G06F 17/30522* (2013.01)
(58) Field of Classification Search
None
See application file for complete search history.

(56) References Cited

U.S. PATENT DOCUMENTS

| 7,937,402 B2 | 5/2011 | Feng et al. |
| 2012/0011139 A1 | 1/2012 | Drissi et al. |

(Continued)

FOREIGN PATENT DOCUMENTS

| JP | WO02/073331 A2 * | 9/2002 |
| WO | 2012057728 A1 | 5/2012 |

OTHER PUBLICATIONS

Buytendijk et al., "Predictive Analytics: Bringing The Tools To The Data", Sep. 2010, An Oracle White Paper, 14 pages.

(Continued)

*Primary Examiner* — Thu Nga Nguyen
(74) *Attorney, Agent, or Firm* — Cantor Colburn LLP; Ryan Lewis

(57) ABSTRACT

An illustrative embodiment of a computer-implemented method for predictive analytic queries includes creating a user-defined predictive analytics query using a set of syntactic grammar that defines a correct syntax of the user-defined predictive analytics query including a created set of predictive analytics by-example vocabularies and a set of subject-specific by-example vocabularies forming a set of by-example vocabularies, wherein the set of syntactic grammar defines semantics of each syntactically correct predictive analytics query using the by-example vocabularies such that predictive analytics queries can be expressed with semantic precision using this constrained Natural Language Processing (cNLP) approach. The computer-implemented method further generates a predictive analytic model and runtime query, using the user-defined predictive analytics query, executes the runtime query using the predictive analytic model to create a result, and returns the result to the user.

20 Claims, 7 Drawing Sheets

(56) References Cited

U.S. PATENT DOCUMENTS

2012/0101860 A1  4/2012  Ezzat
2012/0102053 A1  4/2012  Barrett et al.

OTHER PUBLICATIONS

Nihalani et al., "Natural language Interface for Database: A Brief review", International Journal of Computer Science Issues, vol. 8, Issue 2, Mar. 2011, pp. 600-608.
Sherman, Rick "SearchBusinessAnalytics.com—Using predictive analytics tools and setting up an analytics program", http://searchbusinessanalytics.techtarget.com/news/2240024475/Using-predictive-analytics-tools-and-setting-up-an-analytics-program, Apr. 25, 2013, 3 pages.

* cited by examiner

500 Predict-By-Example GNF Grammar

502
<predictive-by-example-query> ::= <association-query-by-example> |
        <classification-query-by-example> |
        <segmentation-query-by-example> |
        <predictive-classification-query-by-example>

504 <association-query-by-example> ::= GIVEN <defined-data-set> WHICH <qualifier>
        FREQUENTLY OCCURS WITH <qualifier>
        [ WHICH <extreme-expr>]

506 <classification-query-by-example> ::= HOW IS <qualifier> ASSOCIATED WITH <ssv>

508 <segmentation-query-by-example> ::= WHAT COMBINATIONS OF <qualifier> BEHAVE SIMILARLY

510 <predictive-classification-query-by-example> ::= IF <ssv statement> WHAT IS <extreme-expr>

512 <defined-data-set> ::= <qualifier>

514 <extreme-expr> ::= <extreme-indicator> <ssv> |
        <extreme-indicator> <ssv> AND <extreme=expr>

516 <extreme=indicator> ::= MAXIMIZES | MINIMIZES

518 <qualifier> ::= <ssv-expr> | <assertion>

520 <assertion> ::= <is-a-kind-of-assertion> |
        <is-assertion>

522 <is-a-kind-of-assertion> ::= < ssv-expr > IS A KIND OF <assertion-vocab>

524 <is-assertion> ::= <assertion-vocab> IS <ssv statement>

526 <ssv-expr> ::= <ssv> |
        <ssv statement> |
        <ssv-expr> AND <ssv> |
        <ssv-expr> AND <ssv statement>

528 <ssv statement> ::= <ssv> <operator> <ssv-value> |
        <ssv> <operator> <ssv-value> AND <ssv statement>

530 <assertion-vocab> ::= string

532 <ssv> ::= "[" string "]"

534 <operator> ::= '=' | ">" | "<" | ">=" | "<="

536 <ssv-value> ::= string

FIG. 5

PREDICTIVE ANALYSIS BY EXAMPLE

CROSS-REFERENCE TO RELATED APPLICATION

This application claims priority to Canadian Patent Application No. 2779349, filed Jun. 6, 2012, and all the benefits accruing therefrom under 35 U.S.C. §119, the contents of which in its entirety are herein incorporated by reference.

BACKGROUND

This disclosure relates generally to analytic processing in a data processing system and more specifically to assisted predictive analytic processing using examples in the data processing system.

Current predictive analytic tools and offerings are typically too complex to be readily consumable by general users who are not data and predictive analytics experts. A high skill requirement to use the predictive analytic tools and offerings creates a major barrier to general adoption of predictive analytics technologies across major industry domains, despite a critical need for this category of tool.

Typically to create a predictive analytics query against a particular data stream, a user is required to obtain data from multiple, distributed data sources and receive the obtained data into a predictive analytic platform. The user then is required to identify entities in the data as input to participate in the analysis and to identify a target of the analysis. The user is further required to identify the most fitting predictive analytic models, for example, a classification model, a segmentation model or other model that best fits a study the user intends to perform.

Typically these are not tasks general users are capable of performing. Without in-depth knowledge in data schema, analytic models and data types (for example, data types of continuous, ordinal or nominal), predictive analytic tooling is typically out of reach for general users such as doctors or journalists or stock brokers, who need this type of technology to assist them in making decisions in their everyday jobs.

In another example, when provided with typical user-defined queries using natural languages, conventional predictive analytics query systems return unpredictable results or results which are perceived as irrelevant. The erroneous results are due to ambiguous query input when ambiguous or ill-formed queries are presented to the system. In attempting to accommodate users, the user-friendly input typically is not useful from a system perspective.

True natural language systems to query a variety of structured information, leveraging semantics and ontology, include examples from research and industry comprising systems to query a number of source data formats, including program source code, biological information, and databases. Natural language based query interfaces to particular databases exist, however typically with limited commercial success.

A common challenge to all of these methods and systems, however, is the difficulty of accurately parsing and understanding true natural language as provided by an unskilled user. Semantically and syntactically understanding arbitrary natural language remains an open research problem. As a result, many natural language based query systems typically suffer from precision challenges, for example generating queries that do not match an intent of the user. Report or model authors often revert to writing structured query language (SQL) queries or building models by manually using lower level computer languages, for example, SQL or more sophisticated user interfaces.

Enabling end users to express queries in a form of natural language typically hides the users from technical details for constructing queries. A user expresses queries in a free form style. However, a technical restriction in using this type of free form natural language queries is a lack of precision and inherent ambiguity in expressing the intent of the user, which typically renders the system impractical and accordingly unusable.

There are tools enabling users to run predictive models by exposing statistical model details and database schema structure. While the tools are typically very flexible in enabling users to select from a number of predictive analytics models using the database schema and enabling selection of a nature of an element to predict, the tools typically cannot be utilized by people not having detailed knowledge of analytics models and databases. Therefore, use of current tools presents a high barrier to adoption.

In another example, a method for controlling data mining operation by specifying the goal of data mining in natural language is used. Specifically, the method finds correlations between words in a query and database column names/column description by using link-analysis techniques such as Bayes network. Using a probability assigned by a link-analysis algorithm, a user is presented with a list of candidate columns most likely to be the dependent variable. The user then reviews the candidates and makes refinements. The list of candidates, combined with user refinements, is used to construct a list of independent variables. Once the dependent and independent variables are identified, a data mining problem definition is created which can be executed by a data mining application.

However, the data mining example has some severe restrictions because using probabilistic link-analysis techniques (for example, Bayes network) to identify dependent and independent variables means incorrect variables can be identified which require further user intervention. The proposed technique relies on a set of subject-specific vocabularies (SSVs) that are derived from a data source. Metadata may not always be available from a data source and is typically not originally intended for use for this purpose by a database administrator. A further limitation exists in a lack of a mechanism to select an appropriate type of predictive model (for example, an association, a classification or a segmentation model) most relevant to the intent of the user.

SUMMARY

According to one embodiment, a computer-implemented method for predictive analytic queries includes creating a user-defined predictive analytics query using a set of syntactic grammar that defines a correct syntax of the user-defined predictive analytics query including a created set of predictive analytics by-example vocabularies and a set of subject-specific by-example vocabularies forming a set of by-example vocabularies, wherein the set of syntactic grammar defines semantics of each syntactically correct predictive analytics query using the by-example vocabularies such that predictive analytics queries can be expressed with semantic precision using this constrained Natural Language Processing (cNLP) approach. The computer-implemented method further generates a predictive analytic model and runtime query, using the user-defined predictive analytics query, executes the runtime query using the predictive analytic model to create a result, and returns the result to the user.

According to another embodiment, a computer program product includes a computer readable storage medium having computer readable program code embodied thereon. The computer readable program code is executable by a processor to perform a method. The method includes creating a user-defined predictive analytics query using a set of syntactic grammar that defines a correct syntax of the user-defined predictive analytics query including a created set of predictive analytics by-example vocabularies and a set of subject-specific by-example vocabularies forming a set of by-example vocabularies, wherein the set of syntactic grammar defines semantics of each syntactically correct predictive analytics query using the by-example vocabularies such that predictive analytics queries can be expressed with semantic precision using this constrained Natural Language Processing (cNLP) approach. The computer-implemented method further generates a predictive analytic model and runtime query, using the user-defined predictive analytics query, executes the runtime query using the predictive analytic model to create a result, and returns the result to the user.

According to another embodiment, a system for predictive analytics queries includes a processor unit, a generator, and a predictive analytic platform. The processor unit is configured to parse a user-defined predictive analytics query using a set of syntactic grammar that defines a correct syntax of the user-defined predictive analytic query, wherein the user-defined predictive analytics query comprises a created set of predictive analytics by-example vocabularies and a set of subject-specific by-example vocabularies forming a set of by-example vocabularies and user-defined assertions derived from the subject-specific by-example vocabularies, wherein the set of syntactic grammar defines semantics of each syntactically correct predictive analytics query using the by-example vocabularies, such that the user-defined predictive analytics query is expressed with semantic precision using a constrained Natural Language Processing (cNLP) approach. The generator is configured to generate a predictive analytic model and runtime query, using the user-defined predictive analytics query. The predictive analytic platform is configured to execute the runtime query using the predictive analytic model to create a result; and to return the result to a user.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 5 is a textual representation of the grammar operable for various embodiments of the disclosure;

DETAILED DESCRIPTION

Figure 1:
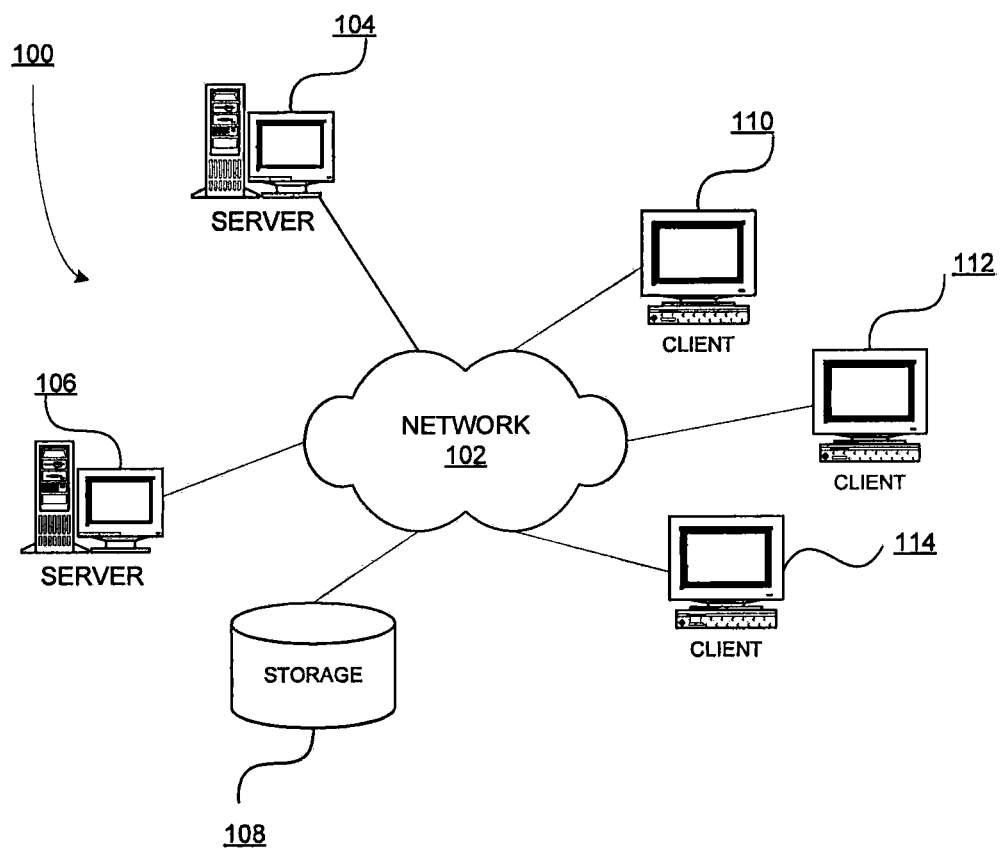
FIG. 1 is a block diagram of an exemplary network data processing system operable for a predict-by-example system in various embodiments of the disclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, radio frequency (RF), etc., or any suitable combination of the foregoing.

Computer program code for carrying out operations for aspects of the present invention may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented method such that the instructions which execute on the computer or other programmable apparatus provide processes for implementing the functions/acts specified in the flowchart and/or block diagram block or blocks.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

With reference now to the figures and in particular with reference to FIGS. 1-7, exemplary diagrams of data processing environments are provided in which illustrative embodiments may be implemented. It should be appreciated that FIGS. 1-7 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wired or wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks such as, for example, an intranet, a local area network (LAN), or a wide area network (WAN). FIG. 1 is intended as an example, and not as an architectural limitation for the different illustrative embodiments.

Figure 2:
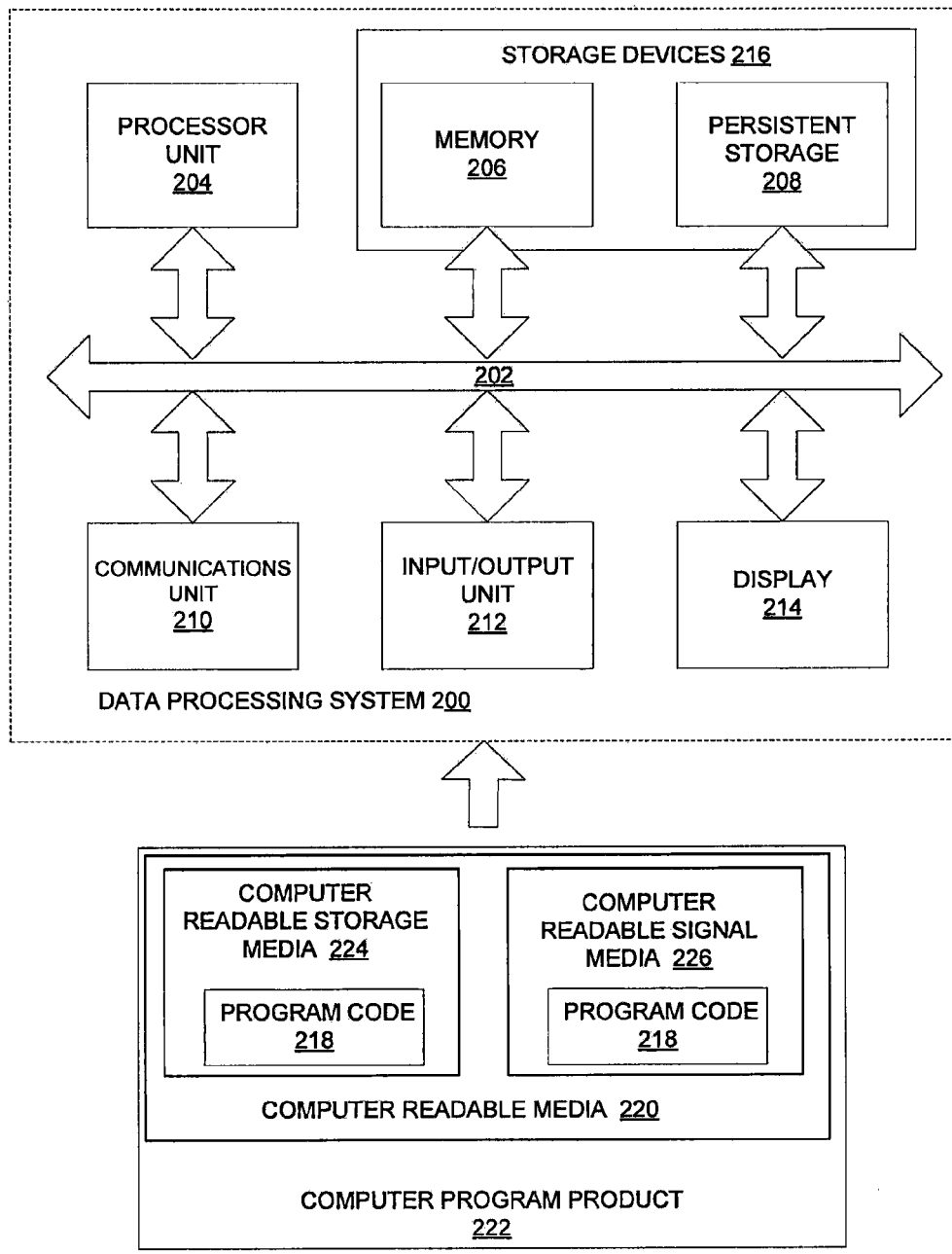
FIG. 2 is a block diagram of an exemplary data processing system operable for a predict-by-example system in various embodiments of the disclosure.

With reference to FIG. 2, a block diagram of an exemplary data processing system operable for various embodiments of the disclosure is presented.

In this illustrative example, data processing system 200 includes communications fabric 202, which provides communications between processor unit 204, memory 206, persistent storage 208, communications unit 210, input/output (I/O) unit 212, and display 214. Data processing system 200 is an example of a data processing system that may be used to implement predictive analytic queries in a network data processing system. Data processing system 200 is also an example of a data processing system that may be used to implement the hardware and software components of computer system 102 in FIG. 1. Data processing system 200 may also be used to implement server 104 in FIG. 1. More particularly, data processing system 200 may be used to implement predict by analysis system 300 of FIG. 3, which may be located in server 106 of FIG. 1.

Processor unit 204 serves to process instructions for software that may be loaded into memory 206. Processor unit 204 may be a number of processors, a multi-processor core, or some other type of processor, depending on the particular implementation. "A number," as used herein with reference to an item means one or more items. Further, processor unit 204 may be implemented using a number of heterogeneous processor systems in which a main processor is present with one or more secondary processors on a single chip. As another illustrative example, processor unit 204 may be a symmetric multi-processor system containing multiple processors of the same type.

Memory 206 and persistent storage 208 are examples of storage devices 216. A storage device is a piece of hardware capable of storing information, such as, for example, without limitation, data, program code in functional form, and/or other suitable information either on a temporary basis and/or a permanent basis. Storage devices 216 may also be referred to as computer readable storage devices in these examples. Memory 206 in these examples may be, for example, one or more of a random access memory or any other suitable volatile or non-volatile storage device. Persistent storage 208 may take various forms, depending on the particular implementation.

Persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for processing by processor unit 204. The processes of the different embodiments may be performed by processor unit 204 using computer-implemented instructions, which may be located in a memory, such as memory 206.

These instructions are referred to as program code, computer usable program code, computer executable instructions or computer readable program code that may be read and processed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for processing by processor unit 204. Program code 218 and computer readable media 220 form computer program product 222 in these examples. In one example, computer readable media 220 may be computer readable storage media 224 or computer readable signal media 226.

Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200.

In some instances, computer readable storage media 224 may not be removable from data processing system 200. In these examples, computer readable storage media 224 is a physical or tangible storage device used to store program code 218 rather than a medium that propagates or transmits program code 218. Computer readable storage media 224 is also referred to as a computer readable tangible storage device or a computer readable physical storage device. In other words, computer readable storage media 224 is media that can be touched by a person.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, a remote data processing system, or some other device capable of storing and transmitting program code 218. For example, program code stored in the computer readable storage medium in data processing system 200 may be downloaded over a network from the remote data processing system to the computer readable storage medium in data processing system 200. Additionally, program code stored in the computer readable storage medium in the server computer may be downloaded over the network from the server computer to a computer readable storage medium in the remote data processing system.

The different components illustrated for data processing system 200 are not meant to provide architectural limitations to the manner in which different embodiments may be implemented. The different illustrative embodiments may be implemented in a data processing system including components in addition to and/or in place of those illustrated for data processing system 200. Other components shown in FIG. 2 can be varied from the illustrative examples shown. The different embodiments may be implemented using any hardware device or system capable of running program code. As one example, data processing system 200 may include organic components integrated with inorganic components and/or may be comprised entirely of organic components excluding a human being. For example, storage devices 216 may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic device, a field programmable logic array, a field programmable gate array, and other suitable hardware devices. With this type of implementation, program code 218 may be omitted, because the processes for the different embodiments are implemented within the hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Additionally, communications unit 210 may include a number of devices that transmit data, receive data, or transmit and receive data. Communications unit 210 may be, for example, a modem or a network adapter, two network adapters, or some combination thereof. Further, a memory may be, for example, memory 206, or a cache, such as found in an interface and memory controller hub that may be present in communications fabric 202.

Using data processing system 200 of FIG. 2 as an example, a computer-implemented method for predictive analytic queries is presented. Processor unit 204 may create a user-defined predictive analytics query using a set of syntactic grammar that defines a correct syntax of the user-defined predictive analytics query, comprising only a created set of predictive analytics by-example vocabularies and a set of subject-specific by-example vocabularies forming by-example vocabularies, wherein the set of syntactic grammar defines semantics of each syntactically correct predictive analytics query using the by-example vocabularies. The user-defined predictive query may include the predictive analytics and subject-specific by-example vocabularies and user-defined assertions derived from the subject-specific by-example vocabularies, where the set of syntactic grammar defines semantics of each syntactically correct predictive analytics query using the by-example vocabularies such that the user-defined predictive analytics query is expressed with semantic precision using a constrained Natural Language Processing (cNLP) approach. Processor unit 204 may further generate a predictive analytic model and runtime query, using the user-defined predictive analytics query, by a parser and generator, may execute the runtime query using the predictive analytic model to create a result, and may return the result to the user.

Figure 3:
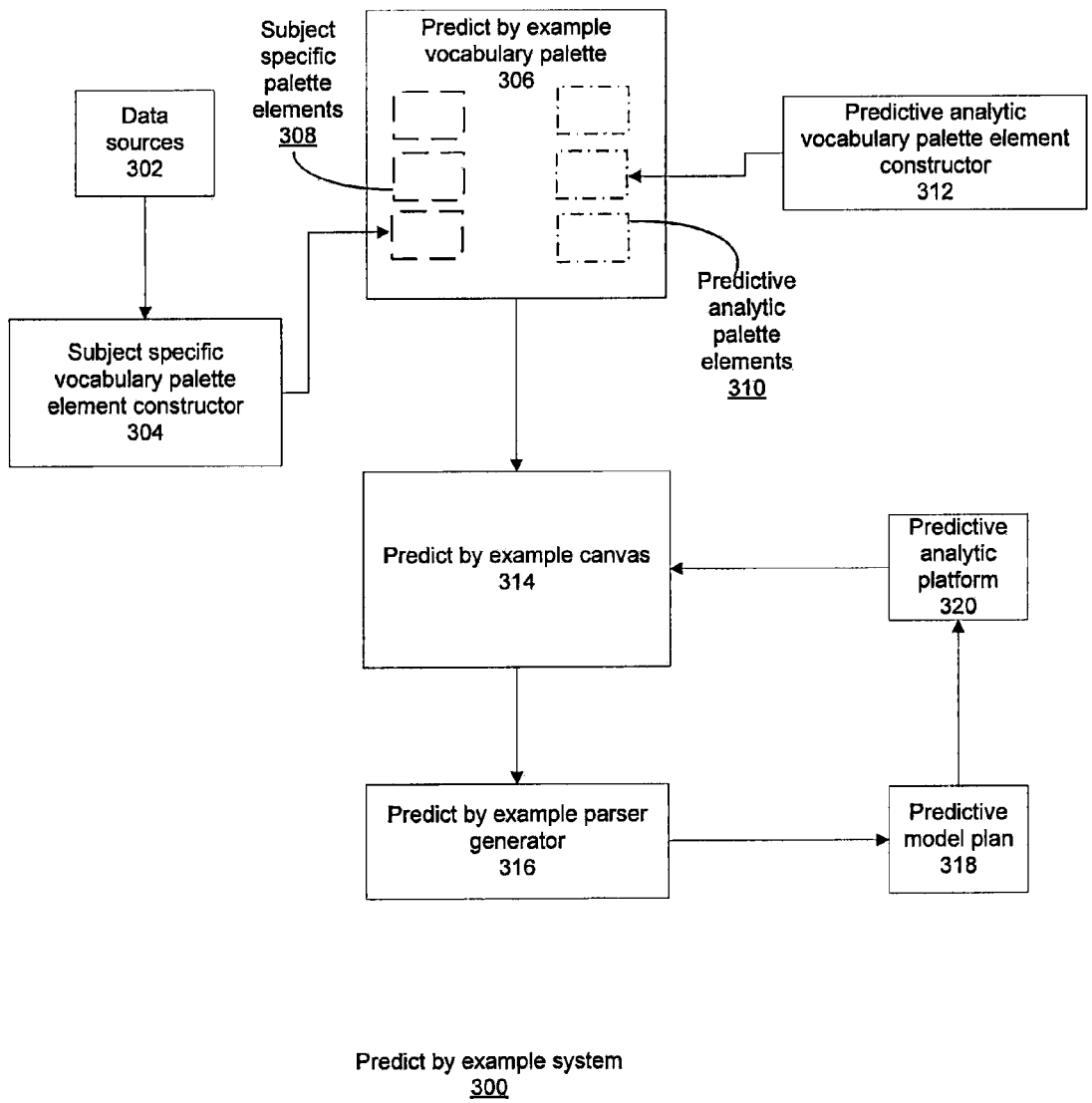
FIG. 3 is a block of a predict-by-example system operable for various embodiments of the disclosure operable for various embodiments of the disclosure.

With reference to FIG. 3, a block diagram of a predict-by-example system operable for various embodiments of the disclosure is presented. Predict-by-example system 300 is an example embodiment of a system providing a capability for creating user-defined predictive analytic queries. Using an embodiment of predict by-example system 300 may enable a user to create a query without having knowledge of the underlying details of modeling or predictive modeling, where the system receives the query, selects an appropriate process to apply to the model, generates appropriate artifacts to run the model, and returns an answer to the user.

This example of predict by-example system 300 uses a set of terms, including vocabulary, to refer to a list or collection of words or phrases of a language or technical field. There may be two groups of vocabularies used with predict-by-example system 300, including subject-specific vocabularies (SSV) and predictive analytic vocabulary (PAV). The vocabularies may also be referred to as by-example vocabularies, subject-specific by-example vocabularies and predictive analytic by-example vocabularies. Palette: defines a collection (of any form) of vocabularies used for constructing predictive queries within a predict-by-example canvas. Subject: defines a branch of knowledge, for example a course of study. Canvas: refers to a space (of any form) for constructing user-defined predictive analytic queries.

Data sources 302 may provide a capability to consume data from a number of sources for use in constructing subject-specific vocabularies. Data sources 302 typically include schema of a data source, which may be metadata that includes ontology and data instances. Ontologies provide a broad scope of information including a controlled vocabulary and rigorous definitions of relationships. Ontologies are typically concerned with process and methodology, regardless of the digital representation. Ontologies and taxonomies may be used to enable information retrieval providing knowledge management and advanced metadata for the system. Subject-specific vocabulary content may be derived, such as by using a mapping or extraction process to identify desired elements, for example, from the data schema of the data sources. In one example, elements of a subject-specific vocabulary contains at least nouns associated with a specific subject area, the subject area for example comprising medical terms associated with a particular branch of medicine. For example, chemotherapy and physiotherapy are subject-specific vocabulary nouns from data schema mapping of a medical data source.

Subject-specific vocabulary palette element constructor 304 may receive and collect elements of the subject-specific vocabulary derived from data sources 302 to create subject-specific palette elements 308 for use with predict-by-example vocabulary palette 306. Subject-specific vocabulary palette element constructor 304 provides an assertion mechanism enabling users or a system for automation to create assertions, with at least (but not limited to) two assertion types.

An is-a-kind-of assertion is used to group subject-specific vocabulary nouns. For example, user can create a treatment as an is-a-kind-of assertion to group nouns of chemotherapy and physiotherapy, in the current medical example. An is assertion may be used to set thresholds or filters by setting a value of one selected subject-specific vocabulary noun (for example, a user can create high blood pressure as an is assertion to set blood pressure (a selected subject-specific vocabulary noun) >100. A set of subject-specific vocabulary palette elements of assertions may be provided, enabling users to construct user-defined by-example predictive analytic queries.

In a corresponding manner, predictive analytic vocabulary palette element constructor 312 may create predictive analytic palette elements 310 of (but not limited to) predictive analytic by-example vocabularies, including one or more elements of: and, or, given, if, how is, what combinations of, associated with, frequently occurs with, behaves similarly, which, what is, maximizes, and minimizes. Predictive analytic palette elements 310 may be applicable for use with more than one set of subject-specific palette elements 308.

Predict-by-example vocabulary palette 306 may include a collection of predictive analytic palette elements 310 and subject-specific palette elements 308 defined for a particular subject matter. Predict-by-example canvas 314 may enable a user to use predict-by-example vocabulary palette 306. In one embodiment, predict-by-example canvas 314 represents a view or visualization of an instance of predict-by-example vocabulary palette 306 using a set of by-example vocabularies comprising a predict-by-example vocabulary and subject-specific by-example vocabulary.

In one embodiment, predict-by-example canvas 314 provides a user interface enabling a user to interactively construct a user-defined predictive analytics query, which is received by predict-by-example parser generator 316. Predict-by-example parser generator 316 may process the user-defined predictive analytics query, using a set of predefined grammar rules into predictive model plan 318 and an executable query for execution by predictive analytic platform 320. A result may be computed by predictive analytic platform 320 and returned to the user in predict-by-example canvas 314.

Figure 4:
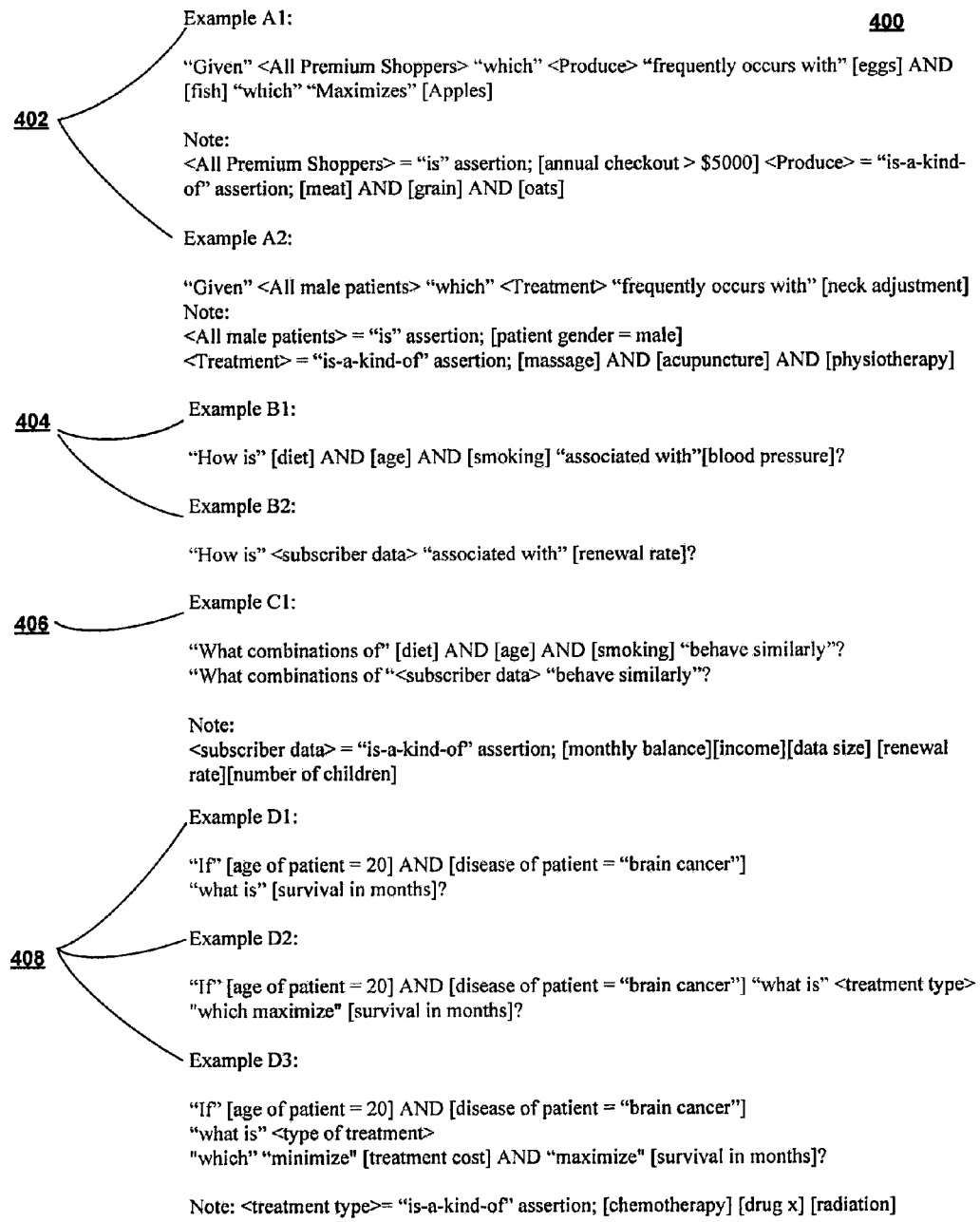
FIG. 4 is a textual representation of four categories of predictive analytic models operable for various embodiments of the disclosure.

With reference to FIG. 4, a textual representation of the four categories of predictive analytic models operable for various embodiments of the disclosure is presented. Categories 400 are examples of the four categories of predictive analytic models used in predict-by-example system 300 of FIG. 3. In the example presented, the following notation is used: predictive analytic by-example vocabularies are in quotation marks as "xxx", subject-specific vocabularies assertions are in angled brackets as <xxx>, and nouns of subject-specific vocabularies are in squared brackets as [xxx].

Example 402 is a set of example queries of an association model in which example A1 defines (1) <All Premium Shoppers>="is" assertion; [annual checkout> $5000] (2) <Produce>="is-a-kind-of" assertion; [meat] AND [grain] AND [oats]. Example A2 defines (1) <All male patients>="is" assertion; [patient gender=male] (2) <Treatment>="is-a-kind-of" assertion; [massage] AND [acupuncture] AND [physiotherapy].

Example 404 is a set of example queries of a classification model (for example, directed clustering), in which example B1 defines a query incorporating predictive analytic by-example vocabularies of "How is" with an "associated with" and a similar construct in example B2.

Example 406 is a set of example queries of a segmentation model (for example, undirected clustering), in which example C1 defines a query incorporating predictive analytic by-example vocabularies of "What combinations of" with "behave similarly". In the example, <subscriber data>="is-a-kind-of" assertion; which may include additional information representing one or more of [monthly balance] AND [income] AND [data size] AND [renewal rate] AND [number of children].

Example 408 is a set of example queries of a predictive classification model in which examples D1, D2 and D3 define a query incorporating predictive analytic by-example vocabularies where <treatment type>="is-a-kind-of" assertion; typically selected from a set of predefined treatments including [chemotherapy] AND [drug x] AND [radiation].

With reference to FIG. 5, a textual representation of the grammar operable for various embodiments of the disclosure is presented. Grammar 500 provides an example, using Backus-Naur Form (BNF) of the semantic and syntactic constructs comprising the grammar used with predictive analytic models and queries in predict-by-example system 300 of FIG. 3.

Parser generator 316 of system 300 of FIG. 3 may use rules of sequence syntax defined in grammar 500. Specified in BNF grammar or any other form of rule expression, the grammar is parsed to automatically prompt a user for a next valid "by-example" vocabulary and to dynamically validate syntactic correctness of "by-example" vocabulary sequence, as the users sequence the by-example vocabularies using predict-by-example canvas 314 of system 300 of FIG. 3 to construct a user-defined predictive analytics query.

Example 502 provides a definition for a predictive by-example query selection of one of four possible categories. Example 504 represents a template of an association category of a predictive by-example query using a <extreme-expr> specifying a subject-specific vocabulary element. In a similar manner, example 506 represents a classification query by example, example 508 represents a segmentation query by example, and example 510 represents a predicative-classification query by example.

Example 512 represents a statement defining a data set. Example 514 represents a statement defining an expression with an indicator in a subject-specific vocabulary or an indicator in a subject-specific vocabulary and including an expression.

Example 516 represents a statement using an indication of a minimizes attribute or a maximizes attribute. Example 518 represents a statement using a subject-specific vocabulary or an assertion as a qualifier. Example 520 represents a statement using either assertion type of the predict-by-example system 300 of FIG. 3.

Example 522 represents a statement using the is-a-kind-of-assertion with a subject-specific vocabulary expression and an assertion. Example 524 represents a statement using an is-assertion with a subject-specific vocabulary and a subject-specific vocabulary statement.

Example 526 represents a statement using a subject-specific vocabulary expression, which is one of a subject-specific vocabulary, a subject-specific vocabulary statement, a subject-specific vocabulary expression and subject-specific vocabulary or a subject-specific vocabulary expression and a subject-specific vocabulary statement. Example 528 represents a statement using a subject-specific vocabulary statement, which is one of a subject-specific vocabulary, operation and a subject-specific vocabulary value, or a subject-specific vocabulary, operation and a subject-specific vocabulary value and a subject-specific vocabulary statement.

Example 530 represents a statement setting an assertion to a string type. Example 532 represents a statement setting an assertion to a specific string value. Example 534 represents a statement setting an operator to a specific logical operator. Example 536 represents a statement setting a subject-specific value to a string type.

Figure 6:
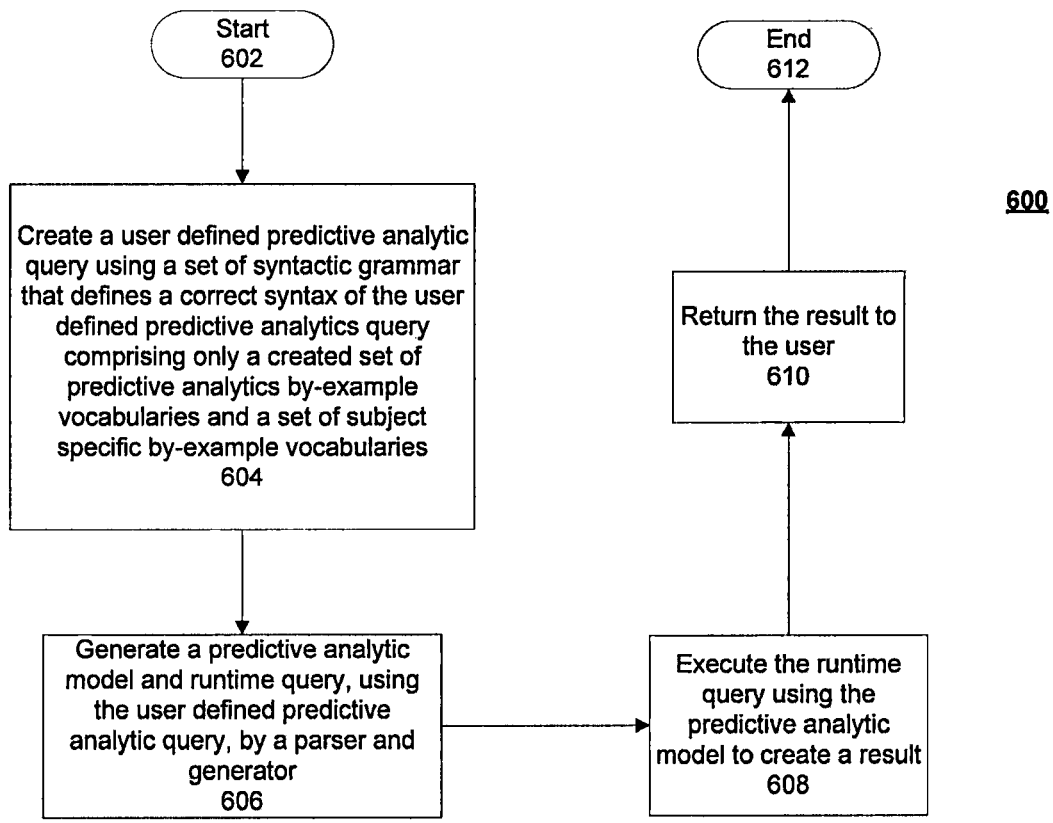
FIG. 6 is a flowchart of a method for creating user-defined predictive analytic queries operable for various embodiments of the disclosure.

With reference to FIG. 6, a flowchart of a method for creating user-defined predictive analytic queries operable for various embodiments of the disclosure is presented. Method 600 is an example method using predictive analytic system 300 of FIG. 3.

Method 600 starts (block 602) and creates a user-defined predictive analytics query using a set of syntactic grammar that defines a correct syntax of the user-defined predictive analytics query comprising only a created set of predictive analytics by-example vocabularies and a set of subject-specific by-example vocabularies (block 604). A user relies upon a set of by-example vocabularies comprising subject-specific vocabularies (SSV) and predictive analytic vocabularies (PAV) used to form a set of corresponding palette elements (in any form of representation), for example subject-specific vocabulary palette elements 308 and predictive analytic vocabularies palette elements 310 of predictive analytic system 300 of FIG. 3.

A palette (in any form of representation) may represent a container of the set of corresponding palette elements of specific vocabulary palette elements 308 and predictive analytic vocabularies palette elements 310 of predictive analytic system 300 of FIG. 3. A predict-by-example canvas may provide an interface upon which predictive analytic queries are constructed using the palette elements and results of predictive analytic queries being displayed.

Method 600 generates a predictive analytic model and runtime query, using the user-defined predictive analytics query, by a parser and generator (block 606). The user-defined predictive query comprises the predictive analytics and subject-specific by-example vocabularies and user-defined assertions derived from the subject-specific by-example vocabularies, wherein the set of syntactic grammar defines semantics of each syntactically correct predictive analytics query using the by-example vocabularies, such that the user-defined predictive analytics query is expressed with semantic precision using a constrained Natural Language Processing (cNLP) approach. Method 600 executes the runtime query using the predictive analytic model to create a result (block 608). The predict-by-example parser and generator processes the predict-by-example queries constructed and submitted by the user and generates corresponding native (machine or program language form) predictive analytics queries for execution.

Method 600 returns the result to the user (block 610) and terminates thereafter (block 612).

Figure 7:
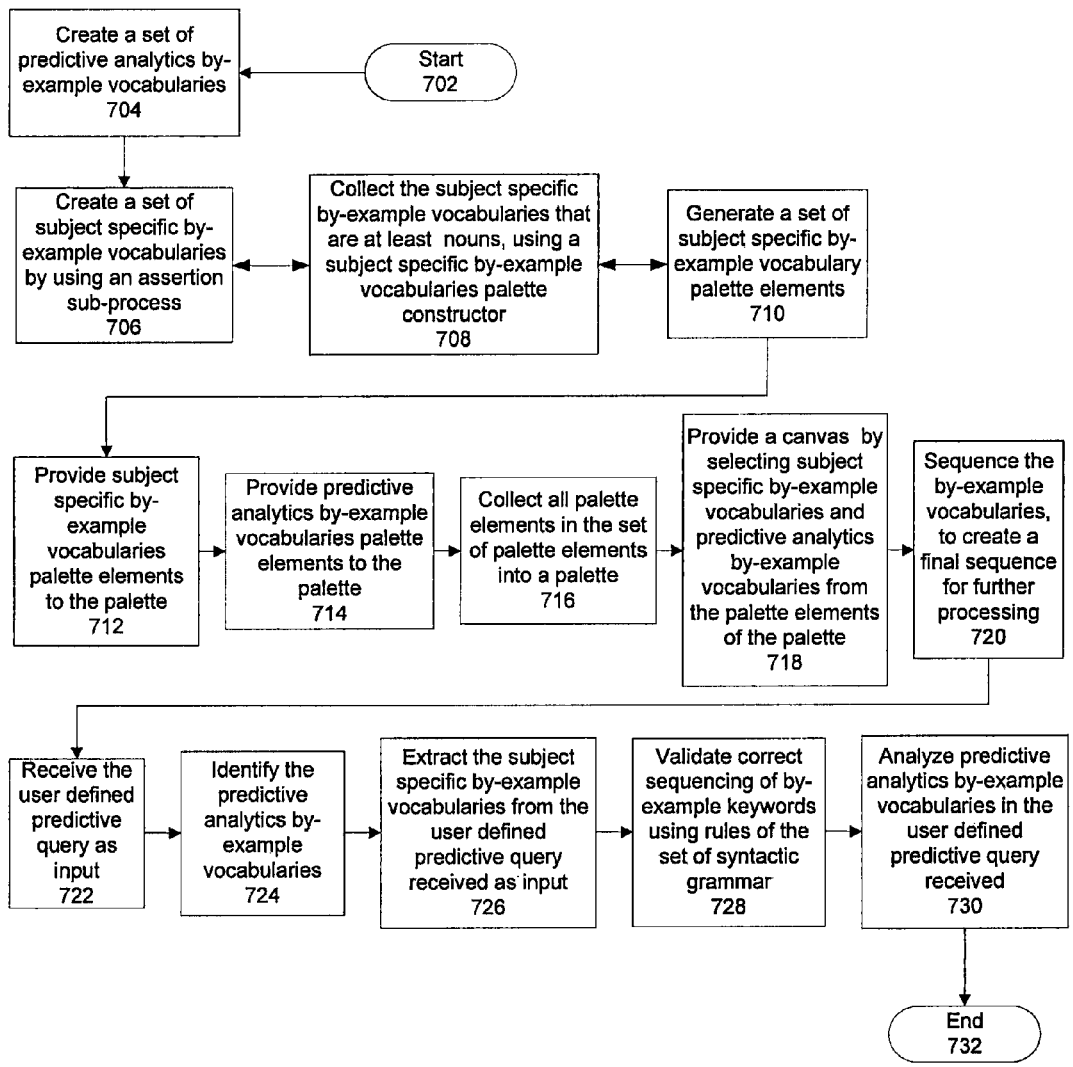
FIG. 7 is a flowchart of a method for creating user-defined predictive analytic queries operable for various embodiments of the disclosure.

With reference to FIG. 7, a flowchart of a method for creating user-defined predictive analytic queries operable for various embodiments of the disclosure is presented. Method 700 is an example method using method 600 of FIG. 6.

Method 700 begins (block 702) and creates a set of predictive analytic vocabularies (PAV) (block 704). Method 700 creates a set of subject-specific vocabularies (SSVs) by derivation from the data schema, which may be metadata containing ontologies and data instances of selected data sources associated with a desired set of predictive analytic queries. The method further includes an assertion mechanism enabling users or a processing system to make assertions using the subject-specific vocabularies. The set of predictive analytic vocabularies is typically derived from the native language and commands of a predictive analytic tooling.

Method 700 collects the subject-specific by-example vocabularies that are at least nouns, using a subject-specific by-example vocabularies palette constructor (block 708). Method 700 generates a set of subject-specific by-example vocabulary palette elements (block 710). Method 700 provides subject-specific by-example vocabularies palette elements to a palette from the subject-specific vocabularies (block 712). Method 700 provides predictive analytic by-example vocabularies palette elements to the palette from the predictive analytic vocabularies (block 714). Method 700 collects all palette elements in the set of palette elements into a palette (block 716). The subject-specific by-example vocabularies palette elements and predictive analytic by-example vocabularies palette elements are collected to provide "by-example" vocabularies, made available to users as palette elements to construct user-defined predictive analytics queries.

Method 700 provides a canvas, upon which the user constructs a predictive analytics query by selecting subject-specific by-example vocabularies and predictive analytics by-example vocabularies from the palette elements of the palette (718). Method 700 sequences the by-example vocabularies to create a final sequence for further processing (block 720).

Method 700 receives the user-defined predictive query in a final sequence as input (block 722). Method 700 identifies the predictive analytics by-example vocabularies (block 724). Method 700 extracts the subject-specific by-example vocabularies from the user-defined predictive query received as input (block 726). Method 700 validates correct sequencing of by-example keywords using rules of the set of syntactic grammar (block 728). The user-defined predictive query comprises the predictive analytics and subject-specific by-example vocabularies and user-defined assertions derived from the subject-specific by-example vocabularies, wherein the set of syntactic grammar defines semantics of each syntactically correct predictive analytics query using the by-example vocabularies, such that the user-defined predictive analytics query is expressed with semantic precision using a constrained Natural Language Processing (cNLP) approach. Method 700 analyzes predictive analytics by-example vocabularies in the user-defined predictive query received (block 730). Method 700 terminates thereafter.

The analysis may include using the data type of the subject-specific vocabularies to determine the semantic of the predictive analytics query specified, along with a selection of which predictive analytic model and what predictive analytics command to generate. The generator may use the decisions of the parser to construct an instance or determine which existing model to reuse, of the predictive analytics model and the corresponding commands, and may invoke the predictive analytics platform for execution. The predictive analytics platform may return the result of the query to the generator. The generator may return the result to the predictive by-example canvas for further processing. The predictive by-example canvas may then display the result to the user.

Thus is presented in an illustrative embodiment a computer-implemented method for predictive analytic queries. The computer-implemented method creates a user-defined predictive analytics query using a set of syntactic grammar that defines a correct syntax of the user-defined predictive analytics query comprising only a created set of predictive analytics by-example vocabularies and a set of subject-specific by-example vocabularies forming by-example vocabularies, and user-defined assertions derived from the subject-specific by-example vocabularies, wherein the set of syntactic grammar defines the semantics of each syntactically correct predictive analytics query using the by-example vocabularies, such that the user-defined predictive analytics query is expressed with semantic precision using a constrained Natural Language Processing (cNLP) approach. The computer-implemented method may generate a predictive analytic model and runtime query using the user-defined predictive analytics query, by a parser and generator; may execute the runtime query using the predictive analytic model to create a result; and may return the result to the user.

Embodiments of the disclosed method may enable users of predictive analytics to express and construct the predictive analytic queries in sentences very close to natural language, by arranging a sequence of preexisting by-example-vocabularies. These preexisting by-example-vocabularies may include predictive analytic vocabularies (PAV) and subject-specific vocabularies (SSV), with a set of rules that define correct sequencing syntax. The resultant sentences may be reminiscent of actual natural language queries, yet the queries are unambiguous in intent and semantics. The queries may also be precise in the system of execution, by-passing a difficulty of free-form natural language alternative.

Using an embodiment of the disclosed method, an issue of ambiguity of user intent and lack of precision of predictive analysis may be overcome by use of constrained by-example vocabularies with a defined set of rules for the syntactic sequencing of these by-example vocabularies. Predictive query by-example sequencing rules, expressed in the form of BNF grammar (for example, by-example sequencing syntax, can be expressed in any other form) used in the query. The most suitable analytics model to be used can be determined with precision, matching the intent of the user.

Embodiments of the disclosed method may therefore enable a user to create a query without knowledge of underlying details of modeling or even predictive modeling and may enable the parser generator to take that query, select the right algorithm to apply to the model, generate the right artifacts to run the model, and then to return the answer to the user, thus providing the power of predictive analytics to users that are not predictive analytics experts.

Embodiments of the disclosure provide a capability to express an intended query of a user using constrained by-example vocabularies with associated, well-defined grammar. The resultant sentences produced from the constrained by-example vocabularies may be parsed using the set grammar. Resultant sentences may be reminiscent of natural language queries, yet the sentences may be unambiguous in intent and precise in terms of the system of execution, bypassing a difficulty previously associated with typical free-form natural language alternative solutions. Therefore, embodiments of the disclosure may significantly lower the barrier of adoption of the predictive analytic technologies to a much wider and more general population.

Embodiments of the disclosure use a constrained form of natural language; in particular, a set of by-example vocabularies in combination with a well-defined set of rules for sequencing syntax. Therefore, using an embodiment of the disclosure may reduce the occurrence of ambiguities in identifying the dependent and independent variables. In addition, embodiments of the disclosure need not rely on database column names or metadata for process-required information; rather some embodiments may use a set of subject-specific vocabulary derived from data sources directly. Sequencing syntactic rules may enable precision in a choice of predictive analytic models, better matching the intention of a predictive query associated with the user.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage medium having computer executable instructions stored thereon in a variety of forms. Examples of computer readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented method for predictive analytic queries, the computer-implemented method comprising:

creating a set of predictive analytics by-example vocabularies;
creating a set of subject-specific by-example vocabularies, each comprising one or more nouns associated with a respective subject area, wherein the one or more subject-specific by-example vocabularies are based on a capability of one or more data sources;
generating a palette of vocabularies for constructing predictive queries, wherein the palette of vocabularies is based on the set of predictive analytics by-example vocabularies and the set of subject-specific by-example vocabularies;
constructing a user-defined predictive analytics query comprising the palette of vocabularies using a set of syntactic grammar that defines a correct syntax of the user-defined predictive analytic query;
wherein the set of syntactic grammar defines semantics of each syntactically correct predictive analytics query using the palette of vocabularies, such that the user-defined predictive analytics query is expressed with semantic precision using a constrained Natural Language Processing (cNLP) approach;
generating, by a computer processor, a predictive analytic model and runtime query, using the user-defined predictive analytics query;
executing the runtime query using the predictive analytic model to create a result; and
returning the result to a user.

2. The method of claim 1, wherein creating the set of subject-specific by-example vocabularies further comprises using an assertion sub-method, wherein the subject-specific by-example vocabularies are derived from input that includes data source schema, metadata including ontology, and data instances.

3. The method of claim 1, wherein creating the set of subject-specific by-example vocabularies further comprises:
collecting the subject-specific by-example vocabularies that are at least nouns, by using a subject-specific by-example vocabularies palette constructor; and
generating a set of subject-specific by-example vocabulary palette elements using an assertion capability in a subject-specific by-example vocabularies palette constructor for use in constructing by-example predictive analytic queries, wherein the assertion capability comprises at least two assertion types including an "is-a-kind-of" assertion, and an "is" assertion.

4. The method of claim 1, wherein the user-defined predictive analytics query is a resultant sentence that is unambiguous in syntax and semantics, and therefore precise in execution.

5. The method of claim 1,
wherein generating the palette of vocabularies further comprises:
providing a set of palette elements with subject-specific by-example vocabularies and the set of predictive analytics by-example vocabularies, as palette elements for use to construct predictive analytics queries; and
collecting all palette elements in the set of palette elements into the palette; and
wherein constructing the user-defined predictive analytics query further comprises:
providing a canvas upon which a predictive analytics query is constructable by selecting subject-specific by-example vocabularies and predictive analytics by-example vocabularies from the palette elements of the palette; and
sequencing the by-example vocabularies to create a sequence for further processing.

6. The method of claim 1, wherein generating the predictive analytic model and runtime query, using the user-defined predictive analytics query, further comprises:
receiving the user-defined predictive analytics query as input;
identifying the predictive analytics by-example vocabularies;
extracting the subject-specific by-example vocabularies from the user-defined predictive analytics query received as input;
validating correct sequencing of one or more by-example keywords using rules of the set of syntactic grammar; and
analyzing the predictive analytics by-example vocabularies in the user-defined predictive analytics query received, together with a data type of the subject-specific by-example vocabularies, to determine semantics of the user-defined predictive analytics query received, including an associated predictive analytics model and predictive analytics command to generate, wherein a generator uses decisions of a parser to perform at least one of constructing an instance of the predictive analytics model along with corresponding commands and selecting an existing model to reuse.

7. The method of claim 5, wherein providing the set of palette elements further comprises:
providing subject-specific by-example vocabularies palette elements to the palette using a subject-specific by-example vocabularies palette element constructor; and
providing predictive analytics by-example vocabularies palette elements to the palette using a predictive analytics by-example vocabularies palette element constructor, wherein the predictive analytics by-example vocabularies palette element constructor further comprises at least predictive analytics by-example vocabularies selected from the group consisting of "given," "how is," "what combinations of," "associated with," "frequently occurs with," "behaves similarly," "which," "what is," "maximizes," "minimizes," "and," "or," and a combination thereof.

8. A computer program product comprising a non-transitory computer readable storage medium having computer readable program code embodied thereon, the computer readable program code executable by a processor to perform a method for predictive analytic queries, the method comprising:
creating a set of predictive analytics by-example vocabularies;
creating a set of subject-specific by-example vocabularies, each comprising one or more nouns associated with a respective subject area, wherein the one or more subject-specific by-example vocabularies are based on a capability of one or more data sources;
generating a palette of vocabularies for constructing predictive queries, wherein the palette of vocabularies is based on the set of predictive analytics by-example vocabularies and the set of subject-specific by-example vocabularies;
constructing a user-defined predictive analytics query comprising the palette of vocabularies using a set of syntactic grammar that defines a correct syntax of the user-defined predictive analytic query;
wherein the set of syntactic grammar defines semantics of each syntactically correct predictive analytics query using the palette of vocabularies, such that the user-defined predictive analytics query is expressed with semantic precision using a constrained Natural Language Processing (cNLP) approach;

generating, by a computer processor, a predictive analytic model and runtime query, using the user-defined predictive analytics query;

executing the runtime query using the predictive analytic model to create a result; and returning the result to a user.

9. The computer program product of claim 8, wherein creating the set of subject-specific by-example vocabularies further comprises using an assertion sub-method, wherein the subject-specific by-example vocabularies are derived from input that includes data source schema, metadata including ontology, and data instances.

10. The computer program product of claim 8, wherein creating the set of subject-specific by-example vocabularies further comprises:

collecting the subject-specific by-example vocabularies that are at least nouns, by using a subject-specific by-example vocabularies palette constructor; and generating a set of subject-specific by-example vocabulary palette elements using an assertion capability in a subject-specific by-example vocabularies palette constructor for use in constructing by-example predictive analytic queries, wherein the assertion capability comprises at least two assertion types including an "is-a-kind-of" assertion, and an "is" assertion.

11. The computer program product of claim 8, wherein the user-defined predictive analytics query is a resultant sentence that is unambiguous in syntax and semantics, and therefore precise in the system of execution.

12. The computer program product of claim 8, wherein generating the palette of vocabularies further comprises:

providing a set of palette elements with subject-specific by-example vocabularies and the set of predictive analytics by-example vocabularies, as palette elements for use to construct predictive analytics queries; and collecting all palette elements in the set of palette elements into a palette; and wherein constructing the user-defined predictive analytics query further comprises:

providing a canvas upon which a predictive analytics query is constructable by selecting subject-specific by-example vocabularies and predictive analytics by-example vocabularies from the palette elements of the palette; and sequencing the by-example vocabularies to create a sequence for further processing.

13. The computer program product of claim 8, wherein generating the predictive analytic model and runtime query, using the user-defined predictive analytics query, further comprises:

receiving the user-defined predictive analytics query as input;

identifying the predictive analytics by-example vocabularies;

extracting the subject-specific by-example vocabularies from the user-defined predictive analytics query received as input;

validating correct sequencing of one or more by-example keywords using rules of the set of syntactic grammar; and analyzing the predictive analytics by-example vocabularies in the user-defined predictive analytics query received, together with a data type of the subject-specific by-example vocabularies, to determine semantics of the user-defined predictive analytics query received, including an associated predictive analytics model and predictive analytics command to generate, wherein a generator uses decisions of a parser to perform at least one of constructing an instance of the predictive analytics model along with corresponding commands and selecting an existing model to reuse.

14. The computer program product of claim 12, wherein providing the set of palette elements further comprises:

providing subject-specific by-example vocabularies palette elements to the palette using a subject-specific by-example vocabularies palette element constructor; and providing predictive analytics by-example vocabularies palette elements to the palette using a predictive analytics by-example vocabularies palette element constructor, wherein the predictive analytics by-example vocabularies palette element constructor further comprises at least predictive analytics by-example vocabularies selected from the group consisting of "given," "if," "how is," "what combinations of," "associated with," "frequently occurs with," "behaves similarly," "which," "what is," "maximizes," "minimizes," "and," "or," and a combination thereof.

15. A system for predictive analytic queries, the system comprising:

a processor unit configured to:

create a set of predictive analytics by-example vocabularies;

create a set of subject-specific by-example vocabularies, each comprising one or more nouns associated with a respective subject area, wherein the one or more subject-specific by-example vocabularies are based on a capability of one or more data sources;

generate a palette of vocabularies for constructing predictive queries, wherein the palette of vocabularies is based on the set of predictive analytics by-example vocabularies and the set of subject-specific by-example vocabularies;

construct a user-defined predictive analytics query comprising the palette of vocabularies using a set of syntactic grammar that defines a correct syntax of the user-defined predictive analytic query;

wherein the set of syntactic grammar defines semantics of each syntactically correct predictive analytics query using the palette of vocabularies, such that the user-defined predictive analytics query is expressed with semantic precision using a constrained Natural Language Processing (cNLP) approach;

a generator configured to generate a predictive analytic model and runtime query, using the user-defined predictive analytics query; and a predictive analytic platform configured to execute the runtime query using the predictive analytic model to create a result and to return the result to a user.

16. The system of claim 15, wherein to create the set of subject-specific by-example vocabularies, the processor unit is further configured to use an assertion sub-method wherein the subject-specific by-example vocabularies are derived from input that includes data source schema, metadata including ontology, and data instances.

17. The system of claim 15, wherein the processor unit is further configured to:

collect the subject-specific by-example vocabularies that are at least nouns, using a subject-specific by-example vocabularies palette constructor; and generate a set of subject-specific by-example vocabulary palette elements using an assertion capability in a subject-specific by-example vocabularies palette constructor for use in constructing by-example predictive analytic queries, wherein the assertion capability comprises at least two assertion types including an "is-a-kind-of" assertion, and an "is" assertion.

18. The system of claim 15, wherein to generate the palette of vocabularies, the processor unit is further configured to:

provide a set of palette elements with subject-specific by-example vocabularies and the set of predictive analytics by-example vocabularies, as palette elements for use to construct predictive analytics queries; and collect all palette elements in the set of palette elements into a palette; and wherein to construct the user-defined predictive analytics query, the processor unit is further configured to:

provide a canvas upon which a predictive analytics query is constructable by selecting subject-specific by-example vocabularies and predictive analytics by-example vocabularies from the palette elements of the palette; and sequence the by-example vocabularies to create a sequence for further processing.

19. The system of claim 15, wherein the processor unit is further configured to:

receive the user-defined predictive analytics query as input;

identify the predictive analytics by-example vocabularies;

extract the subject-specific by-example vocabularies from the user-defined predictive query received as input;

validate correct sequencing of by-example keywords using rules of the set of syntactic grammar; and analyze the predictive analytics by-example vocabularies in the user-defined predictive analytics query received, together with a data type of the subject-specific by-example vocabularies, to determine semantics of the user-defined predictive analytics query received, including an associated predictive analytics model and predictive analytics command to generate, wherein a generator uses decisions of a parser to perform at least one of constructing an instance of the predictive analytics model along with corresponding commands and selecting an existing model to reuse.

20. The system of claim 12, wherein the processor unit is further configured to:

provide subject-specific by-example vocabularies palette elements to the palette using a subject-specific by-example vocabularies palette element constructor; and provide predictive analytics by-example vocabularies palette elements to the palette using a predictive analytics by-example vocabularies palette element constructor, wherein the predictive analytics by-example vocabularies palette element constructor further comprises at least predictive analytics by-example vocabularies selected from the group consisting of "given," "if," "how is," "what combinations of," "associated with," "frequently occurs with," "behaves similarly," "which," "what is," "maximizes," "minimizes," "and," "or," and a combination thereof.

* * * * *